United States Patent

Abramoski et al.

(10) Patent No.: US 8,439,399 B2
(45) Date of Patent: May 14, 2013

(54) AIRBAG WITH TETHERED SLIT

(75) Inventors: Edward Joseph Abramoski, Canton, MI (US); Sean West, Monroe, MI (US); Pardeep Jindal, Canton, MI (US); Djamal Eddine Midoun, Ann Arbor, MI (US)

(73) Assignee: Ford Global Technologies, Dearborn, MI (US)

( * ) Notice: Subject to any disclaimer, the term of this patent is extended or adjusted under 35 U.S.C. 154(b) by 77 days.

(21) Appl. No.: 12/846,904

(22) Filed: Jul. 30, 2010

(65) Prior Publication Data

US 2012/0025505 A1 Feb. 2, 2012

(51) Int. Cl.
*B60R 21/2338* (2011.01)
*B60R 21/205* (2011.01)

(52) U.S. Cl.
USPC .................. 280/743.2; 280/730.1; 280/732

(58) Field of Classification Search ............... 280/743.2, 280/743.1, 730.1, 732
See application file for complete search history.

(56) References Cited

U.S. PATENT DOCUMENTS

| | | | |
|---|---|---|---|
| 6,315,324 B1 | 11/2001 | Keshavaraj | |
| 6,554,317 B2 * | 4/2003 | Lorenz et al. | 280/743.1 |
| 6,962,363 B2 | 11/2005 | Wang et al. | |
| 7,377,548 B2 | 5/2008 | Bauer et al. | |
| 7,458,605 B2 | 12/2008 | Hasebe et al. | |
| 7,475,905 B2 | 1/2009 | Klinkenberger | |
| 7,584,994 B2 | 9/2009 | Narimoto et al. | |
| 7,625,008 B2 * | 12/2009 | Pang et al. | 280/743.1 |
| 7,695,012 B2 | 4/2010 | Libby et al. | |
| 7,708,311 B2 * | 5/2010 | Bito | 280/732 |
| 7,841,622 B2 * | 11/2010 | Pausch et al. | 280/743.2 |
| 7,862,073 B2 * | 1/2011 | Thomas | 280/729 |
| 8,070,183 B2 * | 12/2011 | Kumagai et al. | 280/743.2 |
| 2002/0084638 A1 * | 7/2002 | Neupert | 280/743.1 |
| 2007/0200329 A1 | 8/2007 | Ma | |
| 2007/0205590 A1 | 9/2007 | Klinkenberger et al. | |
| 2007/0205591 A1 * | 9/2007 | Bito | 280/743.2 |
| 2007/0252365 A1 * | 11/2007 | Urushibata et al. | 280/729 |
| 2007/0290489 A1 | 12/2007 | Aranzulla et al. | |
| 2008/0036188 A1 | 2/2008 | Gould et al. | |
| 2009/0283998 A1 | 11/2009 | Kim | |
| 2010/0102542 A1 * | 4/2010 | Nakajima et al. | 280/743.2 |
| 2010/0109306 A1 | 5/2010 | Dong et al. | |
| 2011/0062693 A1 * | 3/2011 | Williams | 280/743.2 |

FOREIGN PATENT DOCUMENTS

| | | |
|---|---|---|
| CA | 2587057 A1 | 11/2007 |
| EP | 2090474 A1 | 8/2009 |
| WO | WO 2008084605 A1 | 7/2008 |

* cited by examiner

*Primary Examiner* — Joseph Rocca
*Assistant Examiner* — Keith Frisby
(74) *Attorney, Agent, or Firm* — Angela M. Brunetti; Frank MacKenzie

(57) ABSTRACT

An airbag having a base end, a front panel and at least one panel opposing the front panel, the airbag having a cutout in the front panel, an inner perimeter of the cutout having first and second sides, a first panel having first and second edges, the first edge of the first panel is attached to the first side of the cutout, a second panel having third and fourth edges, the third edge is attached to the second edge of the first panel and the fourth edge is attached to the second side of the cutout, wherein the first and second panels define a slit in cutout of the front panel, and a tether attached along a backside of the slit and attached to an inner surface of the at least one panel opposing the front panel of the airbag.

7 Claims, 3 Drawing Sheets

US 8,439,399 B2

AIRBAG WITH TETHERED SLIT

TECHNICAL FIELD

The present invention relates to vehicle occupant restraint systems and more particularly to airbags.

BACKGROUND

An airbag is inflated to protect a vehicle occupant in the event of a vehicle collision. The airbag, stored in a folded state within a vehicle instrument panel, is deployed and inflated in the interior of the vehicle. The inflated airbag restrains the vehicle occupant and reduces the potential for injury that may result from a vehicle collision.

The National Highway Traffic Safety Administration (NHTSA) performs vehicle crash tests and applies a five-star rating system to vehicles based on the results of the tests. Five stars are awarded for the highest performing crash tests based on NHTSA's rating system that uses a Combined Probability of Injury (CPI) metric. Results are published for the benefit of consumers as a New Car Assessment Program (NCAP) and the five star rating is highly desirable.

Many factors are relevant in achieving the target for a five-star rating, Neck Injury Criteria (Nij) being a significant one. A measurement, $M_y$, which is a force moment about the neck y-axis, and a force, $F_z$, which is the neck tension or compression component are used to calculate $N_{i,j}$. Therefore, a goal in airbag design is to reduce $M_y$ and $F_z$. A flat front panel utilized in a conventional passenger airbag loads the chin and forehead of a vehicle occupant which may result in a head movement that increases $N_{i,j}$.

There is a need for an airbag design that minimizes loading on the occupant's head and neck. Minimizing loading reduces $M_y$ and $F_z$, thereby reducing Nij and CPI. A lower CPI represents a reduced probability of injury.

SUMMARY

The invention is an airbag having a base end and a front panel, the airbag having a cutout in the front panel, an inner perimeter of the cutout having first and second sides, a first panel having first and second edges, the first edge of the first panel is attached to the first side of the cutout, a second panel having third and fourth edges, the third edge is attached to the second edge of the first panel and the fourth edge is attached to the second side of the cutout, wherein the first and second panels define a slit in cutout of the front panel, and a tether attached along a backside of the slit and attached to an inner surface of the airbag opposing the backside of the slit.

In another embodiment of the invention, the airbag has a base end and a front panel. A cutout in the front panel has first and second sides. A first panel has first and second edges wherein the first edge of the first panel is attached to the first side of the cutout and a second edge of the first panel is attached to an inner surface of the airbag opposing the front panel of the airbag. A second panel having third and fourth edges, the third edge is attached to the first panel at a predetermined distance from the first edge of the first panel, and the fourth edge is attached to the second side of the cutout.

In yet another embodiment of the invention, the airbag has a front panel and a base end. A cutout in the front panel has a slit member attached thereto. The slit member has a predetermined length, width and height. At least a first tether is attached to a backside of the slit member and to an inner surface of the airbag opposing the backside of the slit. In still another embodiment there are second and third tethers also attached to the backside of the slit and the inner surface of the airbag.

In each embodiment, the tether may be attached at the base end of the airbag. In still another embodiment, the tether may incorporate a twist so that attachment at the inner surface is horizontal. Further, the attachment to the inner surface may be at the base end of the airbag.

Elements and steps in the figures are illustrated for simplicity and clarity and have not necessarily been rendered according to any particular sequence. For example, steps that may be performed concurrently or in different order are illustrated in the figures to help to improve understanding of embodiments of the present invention.

DESCRIPTION OF INVENTION

While various aspects of the present invention are described with reference to a particular illustrative embodiment, the invention is not limited to such embodiments, and additional modifications, applications, and embodiments may be implemented without departing from the present invention. In the figures, like reference numbers will be used to illustrate the same components. Those skilled in the art will recognize that the various components set forth herein may be altered without varying from the scope of the inventive subject matter.

Figure 1:
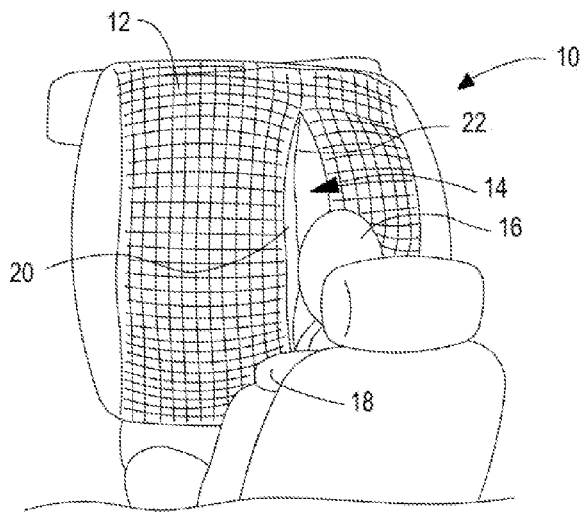
FIG. 1 is a perspective view of an airbag of the present invention in an inflated condition.

FIG. 1 a perspective view of an airbag 10 of the present invention, as it would be inflated as a result of a collision. It should be noted that a passenger side airbag is shown for example purposes only. One skilled in the art is capable of applying the present invention to a driver side airbag or other airbag location without departing from the scope of the present invention. A front panel 12 of the airbag 10 has a slit 14 therein configured to receive a head 16 of a vehicle occupant 18. The slit 14 is a long narrow fissure in the front panel 10 that is positioned in an area of the front panel 12 that receives, or comes in contact with, the vehicle occupant 18, and more particularly, the head 16 of the vehicle occupant 18.

The slit 14 is configured to accommodate a vehicle occupant 18 of many shapes and sizes. The slit 14 is configured as an oval or elliptical shape having a predetermined width 32 at a widest point, a predetermined length 34, and a predetermined depth 30 extending inward from the surface of the airbag 10. The front panel 12 of the airbag 10 has a cutout 60, shown as an oval or elliptical shape. The slit 14 is attached to the front panel 12 at the cutout. The slit 14 has first and second panels, 20, and 22 respectively, that are configured such that when joined together and to the front panel 12, form a fissure in the airbag.

Figure 2:
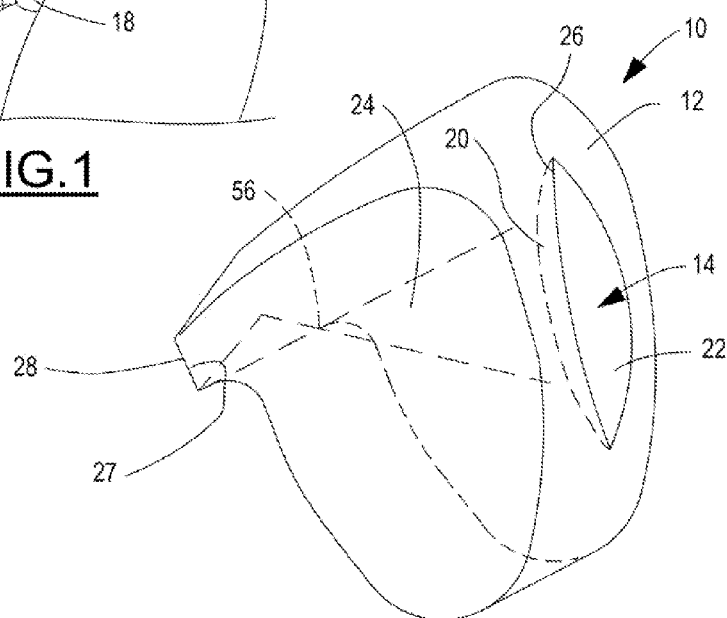
FIG. 2 is a perspective view of the inflated airbag having a cut-away view.

FIG. 2 shows a cut-away perspective view of the airbag 10 having the slit 14 therein. The cut-away reveals a tether 24 that fastens a back surface 26 of the slit 14 to an inner surface 27 of the airbag 10 that is located a predetermined distance from the back surface 26 of the slit 14, such as the base end 28 of the airbag 10. The base end 28 of the airbag is typically attached to a canister that is affixed to an instrument panel of the vehicle, not shown. The tether 24 typically limits a range of motion of the airbag 10 and in the present invention, maintains the dimensional shape of the slit 14. While the embodiment in FIG. 2 shows the tether 24 as attaching to the base end 28 of the airbag 10, it should be noted that this is for example purposes only. The tether 24 may attach to any inner surface of a panel of the airbag 10 that is opposing the back surface of the slit 14.

Figure 3:
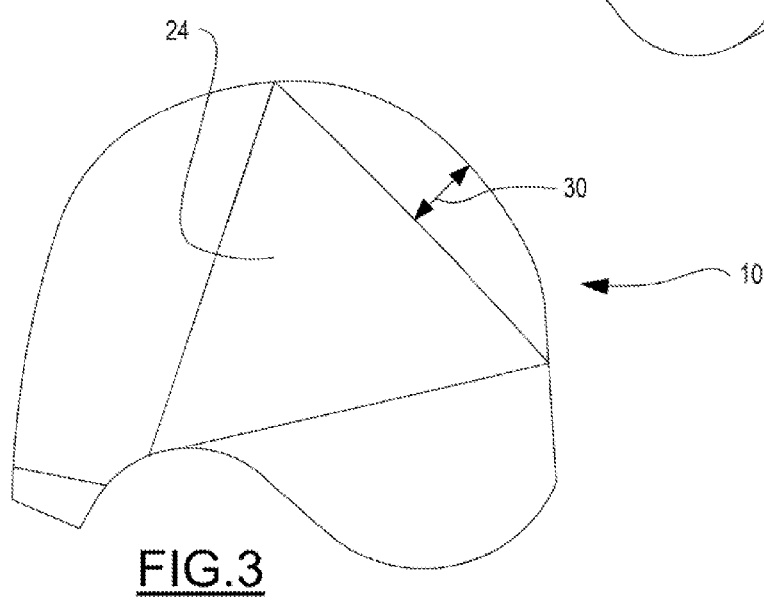
FIG. 3 is a side view of the inflated airbag of the present invention showing a computer model representation.

FIG. 3 is a side view of a cross-section of the airbag 10 and clearly shows the tether 24 that limits the range of movement of the airbag 10. The tether 24 as configured according to the present invention also maintains a predetermined depth 30 of the slit 14. The depth 30 of the slit 14 extends inward from the back surface 26 of the slit 14 and into an interior of the airbag 10 to receive the vehicle occupant 18 upon inflation of the airbag 10 as a result of a collision. A width 32 of the slit, shown in FIG. 1, restricts the occupant's head 16 and allows the head 16 to rotate about the neck, or y-axis, thereby reducing $M_y$ and ultimately lowering $N_{ij}$.

Figure 4:
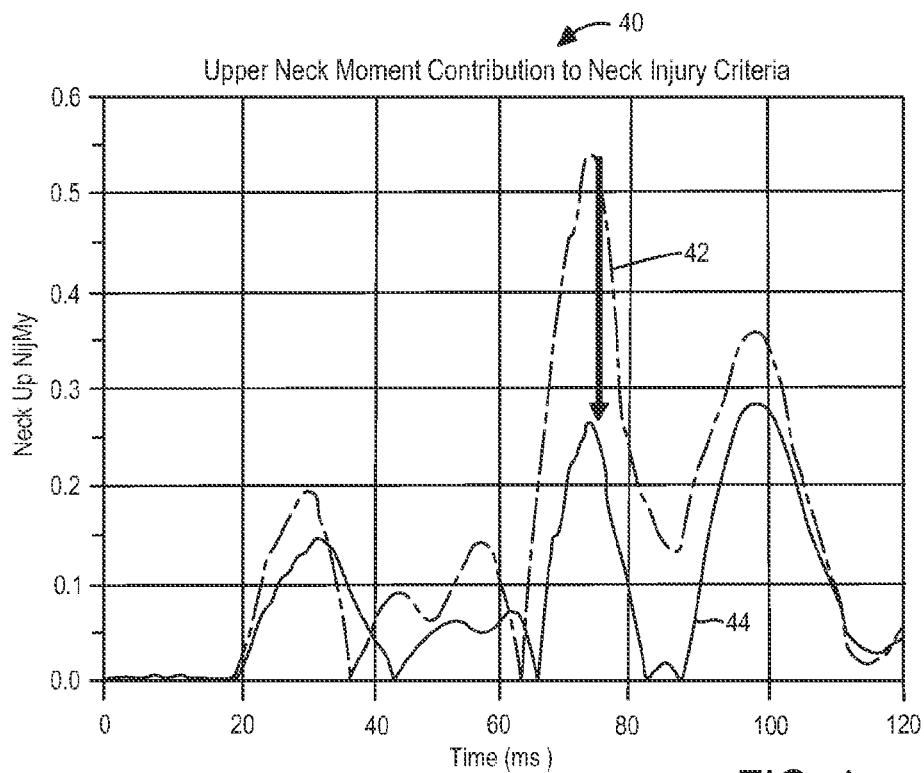
FIG. 4 is a plot of Upper Neck Moment Contribution to Neck Injury Criteria.

There are two components to neck injury criteria. One is $M_y$, which is the flexion moment or extension moment at the upper neck occipital condyle and the other is $F_z$, which is neck tension or compression. The following equation may be used to express Neck Injury Criteria:

$$N_{ij}=F_z/F_{zc}+M_{ocy}/M_{yc} \quad (1)$$

where, $N_{ij}$ is neck injury criteria, $F_z$ is neck tension or compression, $F_{zc}$ is a critical value for neck tension or compression, $M_{ocy}$ is the moment at a vehicle occupant's occipital condyle, and $M_{yc}$ is the critical value at the occipital condyle. Both the $F_{zc}$ and $M_{yc}$ have positive and negative critical values. The slit airbag 10 of the present invention reduces both the moment about the upper neck and neck tension or compression, thereby lowering overall $N_{ij}$. FIG. 4 is a plot 40 of upper neck moment contribution to neck injury criteria, $M_y$, over time for a conventional airbag and an airbag of the present invention. A curve 42 represents the upper neck moment contribution to neck injury criteria for a conventional airbag. A curve 44 represents the upper neck moment to neck injury criteria for a slit airbag 10 of the present invention. The comparison clearly shows the slit airbag 10 of the present invention reduces $M_y$.

Figure 5:
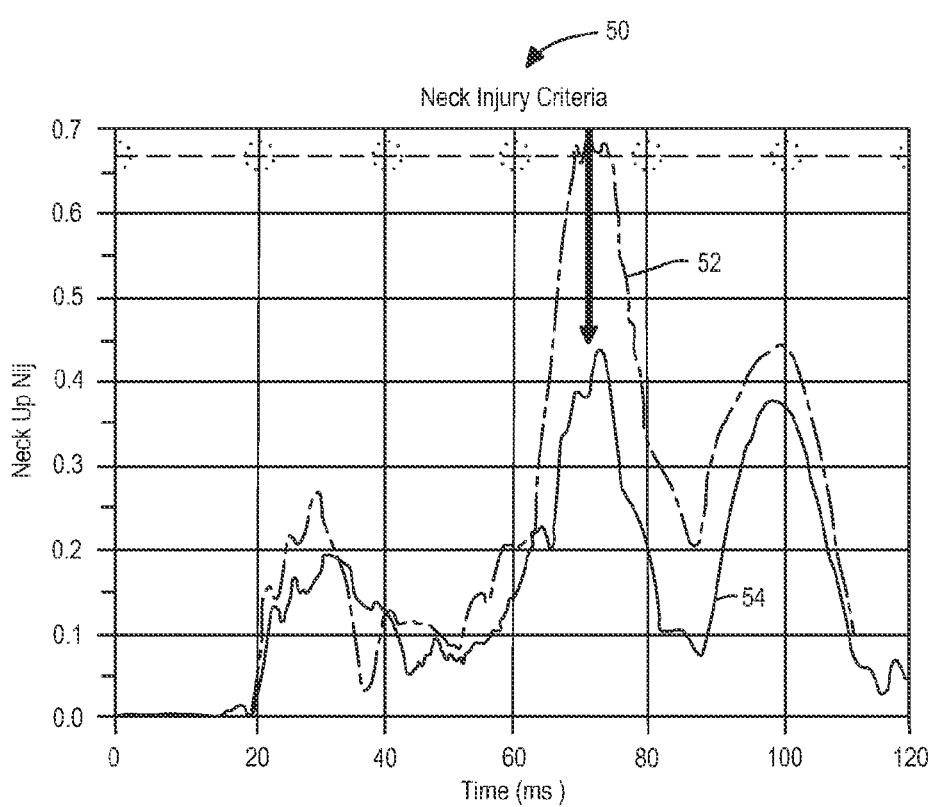
FIG. 5 is a plot of Neck Injury Criteria.

FIG. 5 is a plot 50 of neck injury criteria, $N_{ij}$ over time. A curve 52 is a representation of $N_{ij}$ for a flat front airbag. A curve 54 is a representation of $N_{ij}$ for the slit 14 front panel 12 airbag 10 of the present invention. The comparison of plots clearly shows a reduction in $N_{ij}$ for the slit airbag 10 of the present invention.

Figure 6:
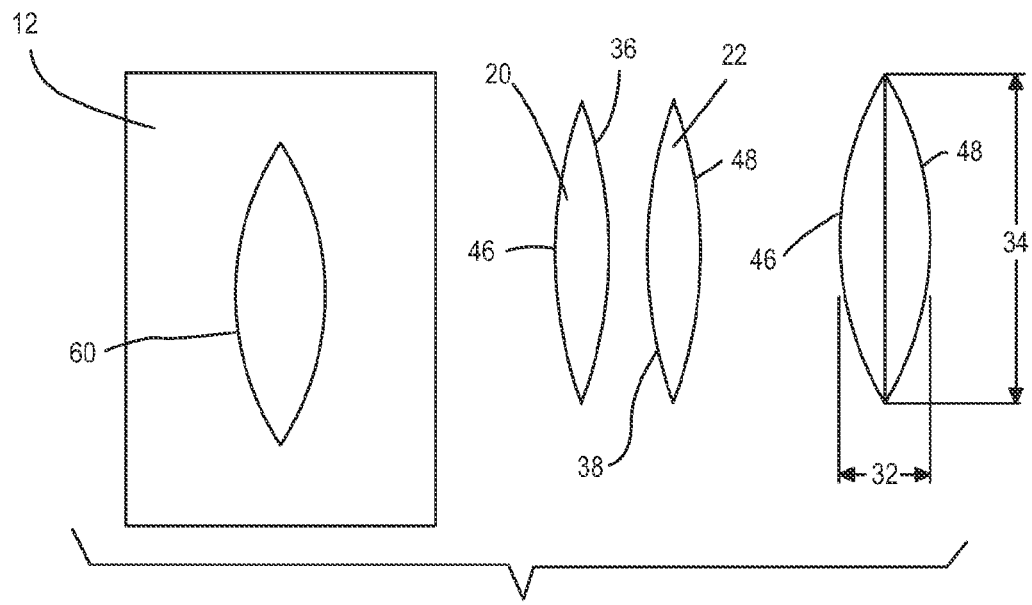
FIG. 6 is a composite figure of a construction of the airbag of the present invention.

Referring again to FIG. 2, the length 34, width 32 and depth 30 dimensions of the slit 14 are defined by the configuration and attachment of the panels 20, 22 to each other and the cutout of the front panel 12, and also by the configuration of the attachment of the panels 20, 22 with the tether 24. FIG. 6 generally shows a composite drawing of an embodiment of the airbag 10 construction in which the airbag front panel has an oval cutout 60 therein. Panel 20 is attached along an edge 36 with an edge 38 of panel 22. Remaining outer edges 46 and 48 of the combined panel are attached to respective sides of the oval cutout 60 in the front panel 12.

Figure 7:
FIG. 7 is a top view of an embodiment of a tether of the airbag of the present invention.

The tether 24, not shown in FIG. 6, may be a panel of material that is attached to the combined edges 36, 38 at the center of the slit 14 as shown in a top view of an embodiment of the slit member 14 configuration in FIG. 7. The combined edges 36 and 38 are attached to each other and to the tether 24. The tether 24 is then attached at the base end 28 of the airbag 10. In an alternative embodiment, shown in a top view in FIG. 8, the panel 20 also comprises the tether 24. Panel 22 is attached to panel 20, at a predetermined section of panel 20, and the remaining portion of panel 20 extending beyond the attachment point, comprises the tether and is attached to the base end of the airbag. In this embodiment, panel 20 also defines the tether 24.

Figure 9:
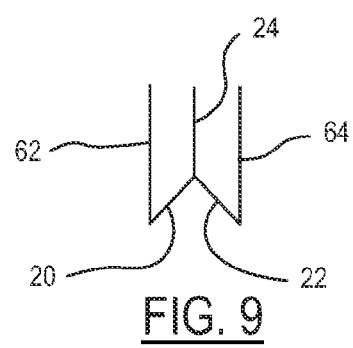
FIG. 9 is a top view of another embodiment of a tether of the airbag of the present invention.

In yet another embodiment, shown in FIG. 9, the slit 14 has three tethers. A first tether 24 is attached to the shared edges 36, 38 of panels 20 and 22 at the center of the slit 14. Additionally, a second tether 62 and a third tether 64 are attached to the outside edges 46 and 48 of the slit 14. In this embodiment, tethers 62 and 64 are shown to be the same length, while tether 24 has a different length. However, it may be possible for tethers 62 and 64 to have lengths that differ from each other as well as tether 24.

Figure 8:
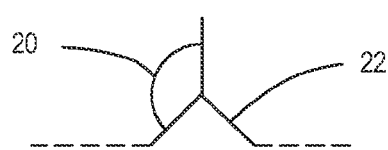
FIG. 8 is a top view of another embodiment of a tether of the airbag of the present invention.

The attachment of the tether 24 to the base end is configured such that the tether 24 is attached vertically with the combined edges 30 and 32 as in the embodiment shown in FIG. 7, or effectively attached vertically with the predetermined section of panel 20 and the edge 32 of panel 24 as in the embodiment shown in FIG. 8. In the embodiment shown in FIG. 9, each of the tethers is vertically attached to the slit. In any embodiment, any one or all of the tethers 24, 62, 64 may be twisted 56, as shown in FIG. 2 such that the attachment to the base end 28 of the airbag 10 is horizontal.

It is an advantage of the present invention that the slit 14 created, with the tethered panels 20 and 22, minimizes the loading on the forehead and neck of a vehicle occupant. Minimizing the loading allows the head to rotate easier and maintains alignment with the neck. Thus, the angle between the head and upper neck is minimized and the neck moment, $M_y$, is lower which in turn lowers $N_{ij}$.

In the foregoing specification, the invention has been described with reference to specific exemplary embodiments. Various modifications and changes may be made, however, without departing from the scope of the present invention as set forth in the claims. The specification and figures are illustrative, rather than restrictive, and modifications are intended to be included within the scope of the present invention. Accordingly, the scope of the invention should be determined by the claims and their legal equivalents rather than by merely the examples described.

For example, the components and/or elements recited in any apparatus claims may be assembled or otherwise operationally configured in a variety of permutations and are accordingly not limited to the specific configuration recited in the claims.

Benefits, other advantages and solutions to problems have been described above with regard to particular embodiments; however, any benefit, advantage, solution to problem or any element that may cause any particular benefit, advantage or solution to occur or to become more pronounced are not to be construed as critical, required or essential features or components of any or all the claims.

The terms "comprise", "comprises", "comprising", "having", "including", "includes" or any variation thereof, are intended to reference a non-exclusive inclusion, such that a process, method, article, composition or apparatus that comprises a list of elements does not include only those elements recited, but may also include other elements not expressly listed or inherent to such process, method, article, composition or apparatus. Other combinations and/or modifications of the above-described structures, arrangements, applications, proportions, elements, materials or components used in the practice of the present invention, in addition to those not specifically recited, may be varied or otherwise particularly adapted to specific environments, manufacturing specifications, design parameters or other operating requirements without departing from the general principles of the same.

What is claimed is:

1. An airbag having a base end and a front panel, the airbag comprising:
    a cutout in the front panel, the cutout having first and second sides;
    a first panel having first and second edges, the first edge of the first panel is attached to the first side of the cutout and a second edge of the first panel is attached to an inner surface of the airbag opposing the front panel of the airbag; and
    a second panel having third and fourth edges, the third edge is attached to the first panel at a predetermined distance from the first edge of the first panel, and the fourth edge is attached to the second side of the cutout.

2. The airbag as claimed in claim 1 wherein the cutout and the second panel are oval-shaped and the first panel is oval-shaped at least at the first edge.

3. The airbag as claimed in claim 1 wherein first panel further comprises a twist at a predetermined distance from the second edge wherein the second edge is attached horizontally to the inner surface of the airbag.

4. The airbag as claimed in claim 3 wherein the horizontal attachment to the inner surface of the airbag is at the base end.

5. An airbag apparatus comprising:
    an airbag having a front panel and a base end;
    a cutout in the front panel;
    a slit member having an outer perimeter attached to an inner perimeter of the cutout the slit member having a predetermined length, width and depth;
    a first tether arranged between a backside of the slit member and an inner surface of the airbag opposing the backside of the slit member and maintaining the predetermined depth of the slit member;
    a first panel having first and second edges, the first edge of the first panel is attached to the cutout and a second edge of the first panel is attached at an inner surface of the airbag opposing the backside of the slit member;
    a second panel having third and fourth edges, the third edge is attached to the first panel at a predetermined distance from the first edge of the first panel defining a depth of the slit member, and the fourth edge is attached to the second side of the cutout defining the slit member; and
    wherein a portion of the first panel that extends beyond the attachment point of the third edge defines the tether.

6. The airbag apparatus as claimed in claim 5 wherein the first tether is twisted at a predetermined distance from the point that the tether attaches to the inner surface such that attachment is horizontal.

7. The airbag apparatus as claimed in claim 6 wherein the horizontal attachment is at the base end.

* * * * *